Jan. 21, 1930.                     C. LONGHI                    1,744,173
         PROCESS OF TREATING ORGANIC SUBSTANCES IN LIQUID STATE ELECTROCHEMICALLY
                           Filed Feb. 27, 1926         2 Sheets-Sheet 1

Carlo Longhi
    Inventor
by Cruse & Braun
       Attorneys.

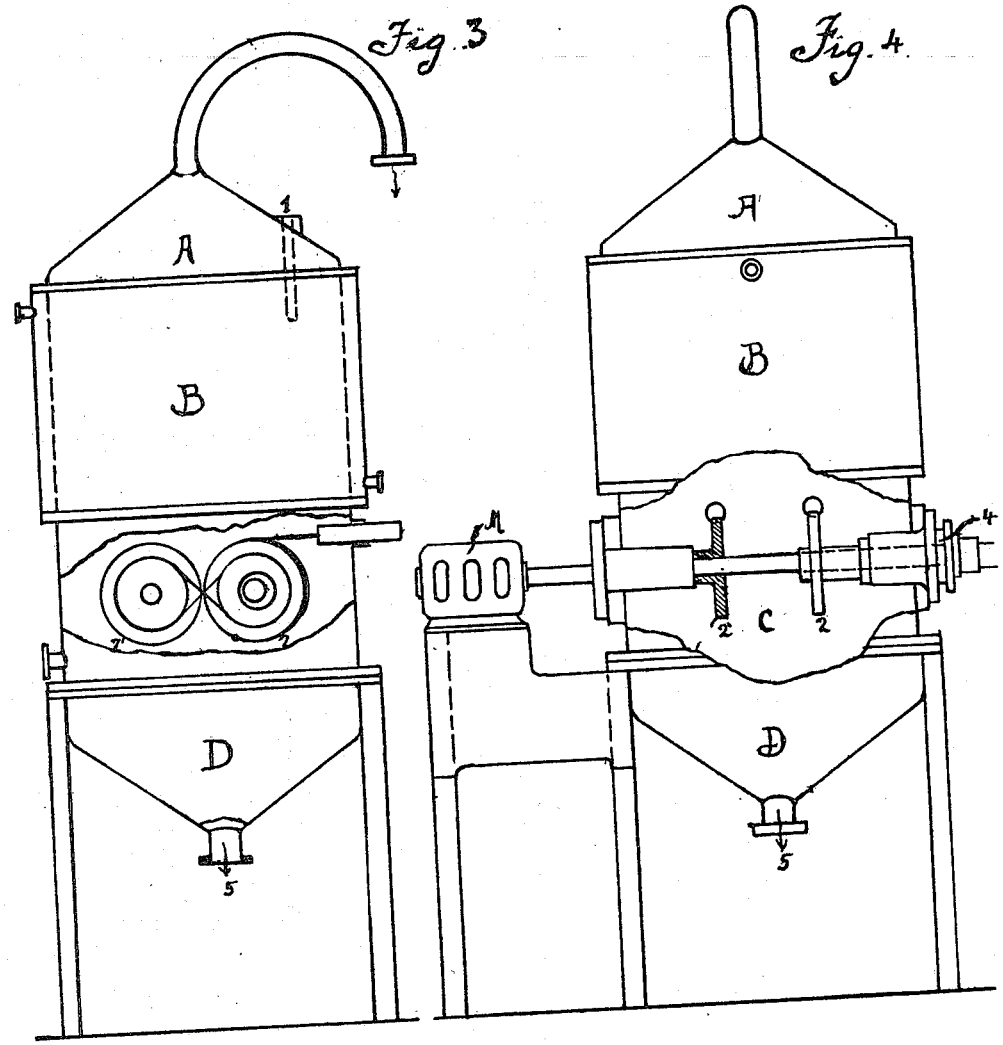

Patented Jan. 21, 1930

1,744,173

UNITED STATES PATENT OFFICE

CARLO LONGHI, OF MILAN, ITALY

PROCESS OF TREATING ORGANIC SUBSTANCES IN LIQUID STATE ELECTROCHEMICALLY

Application filed February 27, 1926, Serial No. 91,142, and in Italy March 7, 1925.

My invention relates to a process of treating organic substances in liquid state electrochemically and to an apparatus therefor, and more particularly to a process of producing acetylene containing mixtures by subjecting liquids to the action of an electric arc whereby different effects from those which are had if vapors of such liquids are treated by the electric arc, and to an apparatus for carrying out the aforesaid process. In practice, I aim to produce acetylene and carbon black from organic substances such as hydrocarbon oils.

If an electric arc is generated beneath the surface of a body of hydrocarbon oil, the oil will be decomposed into acetylene, hydrogen, carbon and a small amount of methane. There is, however, a tendency for the acetylene to be again decomposed into carbon and hydrogen, and it is necessary that the acetylene be withdrawn from the reaction zone almost immediately after it is formed. When fixed electrodes are used, submerged a substantial distance below the surface of a liquid hydrocarbon such as petroleum oil, and the liquid is kept cool, acetylene and carbon black will always be formed. However, as the power is increased and attempts are made to operate on a larger scale, the arc tends to surround itself with a heated body of oil, so that in effect the arc is operating on vapors of the oil instead of acting on the oil in a liquid phase. This tends to produce carbon and only small amounts of acetylene.

I have found that the process can be carried on efficiently if instead of using a fixed arc, the furnace is so arranged that immediately an arc is formed, it is caused to move relatively to at least one of the electrodes until it is lengthened and finally extinguished, when a new arc is immediately formed through a different portion of the liquid. By thus forming or whipping successive arcs through a body of organic substance in liquid condition, the chance of a large vapor body being built up is substantially eliminated and the gases that are formed are enveloped by the relatively cool liquid and thus preserved from decomposition.

Figure 1:
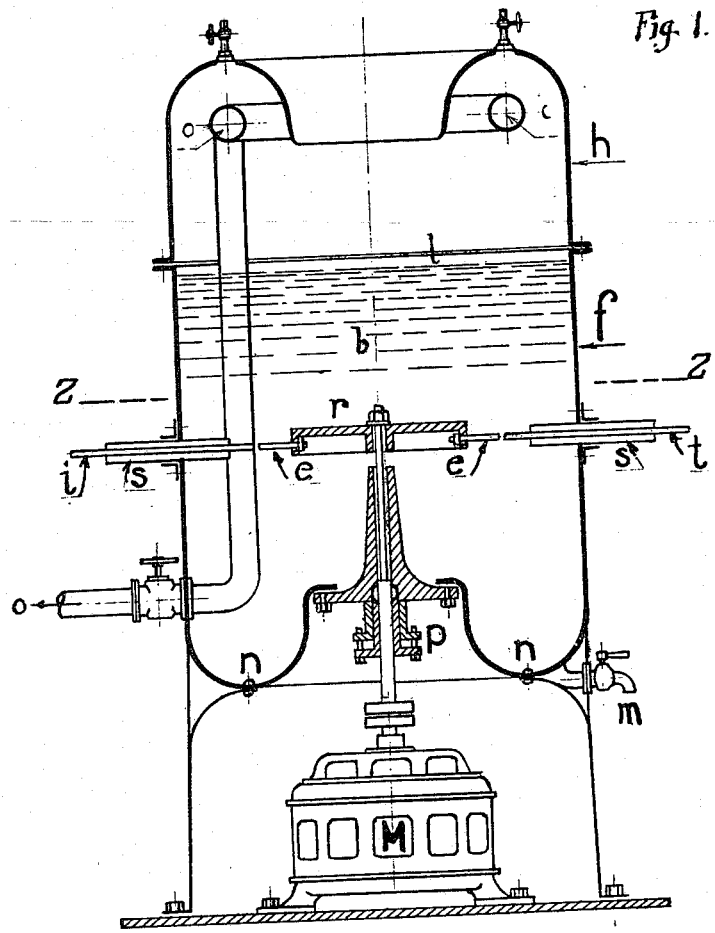
Figure 2:
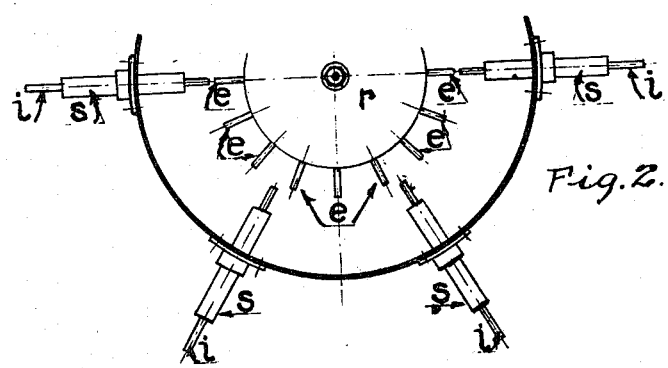

I may carry out my process either by using electrodes so arranged that one is fixed and the other movable in relation to it, or I may have both electrodes movable. Devices embodying both ideas are shown in the accompanying drawings, in which Fig. 1 illustrates a side view of an apparatus in which certain of the electrodes are fixed, while others move relatively to them; Fig. 2 is a section on line 2—2 of Fig. 1; Fig. 3 is a view corresponding to Fig. 1 of a modified form of apparatus in which the electrodes both move, and Fig. 4 is a view taken at right angles to the view shown in Fig. 3. In both Figs. 3 and 4, certain parts are broken away to show the interior arrangements.

In the form of device shown in Figs. 1 and 2, $f$ is the electric furnace proper, consisting of a gas-tight casing, made entirely of metal as already stated, and of any form that may be deemed convenient. In the furnace chamber $b$ the splitting caused by the electric arcs takes place. The carbon sediment deposits itself at $n$—$n$ and can be removed from the circulation without stopping the furnace, except when its presence should unduly alter the insulating power of the hydrocarbon.

At the top portion of the receptacle $f$, a further receptacle $h$ is tightly connected, in which the gases that have been formed are collected. Through a pipe with perforated top portion, or any other convenient means, these gases pass into a piping $o$ by which they are conveyed to any convenient storage point.

M is the synchronous motor driving the revolving member $r$ fitted with sixteen radially arranged metal electrodes $e$, an eight pole motor being assumed in the drawing; $p$ is the motor shaft bearing fitted with stuffing box; $i$ are the stationary metal electrodes, insulated from the metal casing of the furnace by means of non-conducting tubes $s$. As stated above, the arc must start inside of the liquid mass and the level L of the liquid is accordingly shown above the point where the gas bubbles form.

While a varying number of electrodes $e$ may be used on the rotating member $r$, it is preferable that this number be double the number of poles on the motor M.

When two of the electrodes $e$ come opposite a pair of the fixed electrodes *i*, with the voltage wave near maximum, two arcs will be formed. As the electrodes *e* rotate, the oil will rotate with them and the arcs will be bent about the tips of the electrodes *i*, moving with the body of oil. The arcs thus formed will tend to be broken by being stretched to an undue length, but they will be definitely quenched as soon as the next pair of electrodes come between the same pair of fixed electrodes *i*. The second pair of electrodes *e* will come between the original pair of fixed electrodes *i* when the current wave is at a minimum, and will not generate a new arc, but a new arc will be generated by the next successive pair coming into the aforesaid position. These again start the arc when the voltage wave is at its maximum. The intermediate pair of rotated electrodes not only definitely short circuit the original arc, but permit any induced voltage waves to be discharged to the ground and thereby prevent any induction kick. When the second arc is started at the given pair of fixed electrodes *i* the portion of the oil in which the original arc was generated will have moved with the rotating mass of the oil and a different portion of the oil mass will be in position for the arc to be set up in it.

I have found that the action of the moving oil body in bending the arc, once the arc is formed, is sufficiently great so that I may in effect increase the number of movable electrodes to infinity and thus use a rotatable disk instead of a number of points. However, when I do this I find it advantageous (though it may not always be necessary) to have both electrodes rotate. An arrangement of this sort is illustrated in Figs. 3 and 4. The furnace here illustrated comprises four parts or zones as follows:

A is the collecting zone for the gas and for that portion of the carbon black (resulting from the splitting or demolition of the liquid hydrocarbon molecule) that is entrained by the gas.

B is the cooling zone for the liquid hydrocarbon under treatment which should be kept at a low temperature so that the gases which will pass through this liquid may be promptly cooled. If desired, the hydrocarbon oil may be cooled by circulating a part through a cooling device located outside of the furnace proper. If this is done the warmer liquid should be withdrawn near the top and the cooled liquid re-introduced at the bottom. The liquid thus circulated may be filtered to remove any carbon black which it may contain. However, in the form of device illustrated the zone B is surrounded by a water jacket through which cool water can be passed. If desired a thermometer may be inserted at the point *i*. Ordinarily a temperature of about 100° C. will be found satisfactory.

C is the reaction zone for splitting the liquid hydrocarbons (or other material under treatment) into a mixture of hydrocarbon gases and carbon black. In this zone the arc will produce gas bubbles which will be of decreasing temperature as they progress from the center to the periphery. Accordingly, a certain amount of ordinary cracking will go on with the formation of light and easily condensable hydrocarbons as well as the formation of acetylene.

D is the zone where impurities will collect and from which residual hydrocarbon oil may be discharged when it is desired to empty the furnace. From the collecting zone A the gas may be passed through special filters for removing carbon black and then through condensers for removing light hydrocarbons and then through purifiers to remove any gases such as hydrocyanic acid which may be present.

Within the zone C are positioned the rotating electrodes. In the illustrative example shown these are four in number, arranged in two pairs. The two disks designated by the numeral 2 are the current intake electrodes. These are suitably insulated from the furnace casing but are connected to a source of high tension current through brushes as indicated at 3. The other two disks 2' are in electrical connection with the furnace casing which in turn is grounded. The two disks 2'—2' are carried by a common shaft driven by a motor M. By means of a light transmission, such as a crossed rope, (which may be carried by insulated pulley wheels) or any equivalent mechanical device, the drive is transmitted to the other disks 2—2. These disks are all of the same diameter and therefore all of their peripheral velocities are the same. The motor connection is so arranged that the disks move upwardly at the points where their faces are close together so that fluid currents are set up in the body of the oil which move upwardly between the disks and which positively move the liquid to effect a separation of the gaseous products produced by the arc discharges from the influence of subsequent arc discharges and a complete envelopment of the said gaseous products by the organic liquid overlying the arc discharges. In order that the size of the gap between the respective pairs of disks 2—2' may be adjusted, the disks 2—2 are supported on an eccentric shaft 4 which extends out of the furnace casing.

When this form of furnace is in operation, an arc will spring between the adjacent faces of each pair of disks 2—2'. This arc will immediately form about itself a minute envelope of gas lowering the electrical resistance. This envelope will move upwardly with the current of oil and the rotation of the disks so that it will gradually be elongated until it breaks. As soon as this occurs the gas which surrounded the arc will be left as a bubble surrounded by cool oil, which will be positively moved by the agitation and the fluid currents within the body of the liquid away from the arc discharge region whereby the gaseous products containing acetylene are protected from further decomposition by subsequent arc discharges and are permitted to leave the body of liquid without being subjected again to the action of an arc discharge. Thereupon a new arc will form between each of the pair of disks 2—2' and these arcs will pass through different portions of the oil mass from the first pair of arcs.

The casing of the furnace is preferably of metal and as stated should be grounded. It also should be made gas-tight so that a small internal pressure can be built up to cause the generated gas to flow out and to prevent air from leaking in.

The electrical voltage used may vary within wide ranges, depending on the output sought and the nature of the material under treatment. In some cases the tension may exceed 50,000 volts. The peripheral speed of the electrodes should be adjusted to suit this voltage, so that the arc will stretch gradually and be extinguished at about the time that the voltage wave is passing through the zero point. In order that a new arc may be formed immediately, the spacing between the electrodes should be very small. In some cases this may demand the use of a suitable reactance in the electric circuit in order to equalize the supply of energy.

What I claim is:

1. A process of treating an organic liquid electrochemically, which comprises whipping successive electric arc discharges in an upward direction through a body of organic liquid by moving at least one of the electrodes within the body of the liquid during the time of formation and extinguishment of each arc.

2. A process of treating an organic liquid electrochemically, which comprises whipping successive electric arc discharges in an upward direction through a body of organic liquid by moving both of the electrodes within the body of the liquid during the time of formation and extinguishment of each arc.

3. A process of treating an organic liquid electrochemically, which comprises whipping successively electric arc discharges in an upward direction through a body of organic liquid by moving the arcing point of both electrodes within the body of the liquid in the same direction and simultaneously away from each other during the time of formation and extinguishment of each arc.

4. A process of producing acetylene containing mixtures which comprises maintaining a body of organic substance, subjecting an interior portion of said substance to the action of recurring electric arc discharges, moving at least one end of each of said arc discharges upwardly within said body to cause each arc to break, and thereby agitating said body to positively move the gaseous products formed by said discharges from each arc discharge in an upwardly direction away from the arc discharge region, whereby substantial decomposition of acetylene is prevented, and removing the gaseous products containing acetylene therein, without permitting them to be acted upon by one of the successive arc discharges.

5. A process as set forth in claim 10 in which the breaking of the arc is effected positively and thereby extinguishing the arc at a predetermined instant and also dissipating any induced voltage.

6. A process of treating organic material in liquid form electrochemically to produce demolition of the molecules of said organic material and to effect synthesis between products of said decomposition which comprises periodically forming electric arcs between electrodes lying within the mass of said organic liquid and immediately lengthening the said arcs through said liquid by the motion of at least one of the electrodes with respect to the other electrode.

7. A process of treating organic material in liquid form electrochemically to produce demolition of the said organic material and to effect synthesis between products of such decomposition, which comprises periodically forming electric arcs between a plurality of disc electrodes lying within the mass of said organic liquid, and immediately lengthening said arcs through the said liquid by the rotation of at least one disc of each set.

8. A process of treating organic material in liquid form electrochemically to produce demolition of the molecules of said organic material and to effect synthesis between products of said decomposition which comprises periodically forming electric arcs between electrodes lying within the mass of said organic liquid and causing a subsequent lengthening of the said arcs by the natural lifting motion of fluid currents within the body of liquid set up and resulting from the motion in an upward direction of at least one of the electrodes with respect to the other.

9. A process of treating organic material in liquid form electrochemically to produce demolition of the molecules of said organic material and to effect synthesis between products of said decomposition which comprises periodically forming electric arcs between electrodes lying within the mass of said organic liquid and causing a subsequent lengthening of the arcs to their breaking points by the motion of at least one of the electrodes with respect to another electrode and synchronizing the motion with the applied electric power so as to break the arc at a point where the voltage of the arc approximates zero.

10. A process of producing acetylene mixed with other gases and lampblack by the electric treatment of organic material in liquid form, which comprises producing within the liquid mass of said organic material a periodically occurring formation of electric arcs passing through said liquid between mating disc electrodes rotating continuously to whip the arcs in an upward direction, whereby products of decomposition and of synthesis are produced in the liquid, imparting to the said liquid a raising motion by means of the said rotation of the electrodes, thus effecting the lengthening of the arcs until the rupture thereof, while facilitating both the removal from the arcing zone and the consequent separation of the produced gases from the liquid and simultaneously preventing successive arcs from being formed in the gas itself.

11. A process of producing acetylene mixed with other gases and lampblack which comprises electrically treating liquid hydrocarbons of complex molecular structure with electric arcs, produced within the mass of the hydrocarbon between mating disc electrodes rotating continuously and upwardly from their mating points, such motion of the electrodes within the liquid causing instantaneous cooling of the produced gases by positively causing them to pass through the mass of liquid hydrocarbon located above the arc, while causing gas-free liquid to be drawn from below into the arcing zone.

12. A process for producing actylene mixed with gases and lampblack which consists in treating a liquid hydrocarbon having a complex structure to periodically recurring arc discharges, causing each arc to act each time on delimited portions of the mass of said liquid and thus converting the affected part of the liquid into split and synthetic products, applying an external force, effective to move the electrodes within the mass of the liquid and thereby favoring the displacement of the arc from its initial position, rupturing each arc at each semi-alternation of the current employed, rapidly removing the formed gases from the effective arc zone by the said motion of the electrodes, so that the successive arcs cannot exert injurious action on the said gases, but cause the liquid hydrocarbon to completely envelop the products of decomposition and of synthesis during their production in such a manner that by the movement of the enveloping liquid the gaseous products are instantaneously cooled through that portion of said liquid which at said moment lies over the arcing zone.

CARLO LONGHI.